(12) United States Patent
Atobe

(10) Patent No.: US 10,974,146 B2
(45) Date of Patent: *Apr. 13, 2021

(54) STORAGE MEDIUM STORING GAME PROGRAM, GAME PROCESSING METHOD, AND INFORMATION PROCESSING APPARATUS

(71) Applicant: GREE, INC., Tokyo (JP)

(72) Inventor: Hirohiko Atobe, Tokyo (JP)

(73) Assignee: GREE, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/583,692

(22) Filed: Sep. 26, 2019

(65) Prior Publication Data

US 2020/0016490 A1 Jan. 16, 2020

Related U.S. Application Data

(63) Continuation of application No. 16/277,144, filed on Feb. 15, 2019, now Pat. No. 10,449,452, which is a (Continued)

(30) Foreign Application Priority Data

May 31, 2013 (JP) .................................. 2013-116039
Dec. 26, 2013 (JP) .................................. 2013-268385
Mar. 5, 2014 (JP) .................................. 2014-042491

(51) Int. Cl.
*A63F 13/52* (2014.01)
*A63F 13/822* (2014.01)
(Continued)

(52) U.S. Cl.
CPC .............. *A63F 13/52* (2014.09); *A63F 13/21* (2014.09); *A63F 13/25* (2014.09); *A63F 13/35* (2014.09);
(Continued)

(58) Field of Classification Search
USPC .......................................................... 463/31
See application file for complete search history.

(56) References Cited

U.S. PATENT DOCUMENTS 6,419,584 B1 7/2002 Sakamoto et al.
6,690,376 B1 2/2004 Saito et al.
(Continued)

FOREIGN PATENT DOCUMENTS

JP 2003-320163 A 11/2003
JP 2005-292886 A 10/2005
(Continued)

OTHER PUBLICATIONS

Motion for Order of Provisional Disposition by GREE in Case No. H29 YO22165 of Japanese Patent No. 6125128, submitted Jul. 13, 2017.

(Continued)

*Primary Examiner* — Pierre E Elisca
(74) *Attorney, Agent, or Firm* — Oliff PLC

(57) ABSTRACT

A non-transitory computer readable recording medium stores game program code instructions for a game in which users do battle, and the game program code instructions cause a computer to perform a data storage function of storing a first panel data that includes a plurality of panels associated with the first user to a storage unit; a control function of receiving information regarding a selection by the first user, the selection being for one or more panels indicating characters to be disposed in one or more divisions of a game display screen including a display region formed by the divisions; the data storage function further stores the panel associated with information of motion to the storage unit, and the control function transmits information for displaying the panel as a moving character according to the
(Continued)

information of motion associated with the panel when the panel is disposed in a target division.

10 Claims, 12 Drawing Sheets

Related U.S. Application Data continuation of application No. 15/686,268, filed on Aug. 25, 2017, now Pat. No. 10,328,346, which is a continuation of application No. 15/391,123, filed on Dec. 27, 2016, now Pat. No. 9,770,659, which is a continuation of application No. 15/253,964, filed on Sep. 1, 2016, now Pat. No. 9,636,583, which is a continuation of application No. 14/291,358, filed on May 30, 2014, now Pat. No. 9,457,273.

(51) Int. Cl.
| | | |
|---|---|---|
| *A63F 13/21* | (2014.01) | |
| *A63F 13/25* | (2014.01) | |
| *A63F 13/35* | (2014.01) | |
| *A63F 13/537* | (2014.01) | |
| *A63F 13/95* | (2014.01) | |

(52) U.S. Cl.
CPC .......... *A63F 13/537* (2014.09); *A63F 13/822* (2014.09); *A63F 13/95* (2014.09); *A63F 2300/308* (2013.01); *A63F 2300/65* (2013.01)

(56) References Cited

U.S. PATENT DOCUMENTS

| | | | |
|---|---|---|---|
| 7,371,165 | B2 | 5/2008 | Reizei et al. |
| 9,770,659 | B2 | 9/2017 | Atobe |
| 2006/0281545 | A1 | 12/2006 | Nakano et al. |
| 2007/0032282 | A1* | 2/2007 | Hamamoto ........... A63F 13/533 463/9 |
| 2007/0105626 | A1 | 5/2007 | Cho et al. |
| 2013/0288787 | A1* | 10/2013 | Yoshie .................... A63F 13/12 463/30 |
| 2014/0221094 | A1* | 8/2014 | Fujioka ................... A63F 13/22 463/31 |
| 2014/0248947 | A1* | 9/2014 | Yoshie .................... A63F 13/48 463/30 |
| 2014/0295937 | A1* | 10/2014 | Takahashi ............. G07F 17/326 463/20 |
| 2014/0357363 | A1 | 12/2014 | Atobe |
| 2015/0057085 | A1* | 2/2015 | Tagawa ................ A63F 13/822 463/42 |

FOREIGN PATENT DOCUMENTS

| | | |
|---|---|---|
| JP | 2006-223904 A | 8/2006 |
| JP | 2006-341024 A | 12/2006 |
| JP | 2007-252696 A | 10/2007 |
| JP | 2012-061059 A | 3/2012 |
| JP | 2013-54519 A | 3/2013 |
| JP | 2014-233403 A | 12/2014 |

OTHER PUBLICATIONS

GREE's Second Brief in Case No. H29 YO22165 of Japanese Patent No. 6125128, submitted Nov. 17, 2017.
GREE's Third Brief in Case No. H29 YO22165 of Japanese Patent No. 6125128, submitted Feb. 5, 2018.
Supercell's First Brief in Case No. H29 YO22165 of Japanese Patent No. 6125128, submitted Oct. 24, 2017.
Supercell's Third Brief in Case No. H29 YO22165 of Japanese Patent No. 6125128, submitted Dec. 26, 2017.
Report on Operation Check of Yu-Gi-Oh by Shinya Kamada, submitted Dec. 26, 2017 in Case No. H29 YO22165 of Japanese Patent No. 6125128.
Supercell's Fourth Brief in Case No. H29 YO22165 of Japanese Patent No. 6125128, submitted Feb. 27, 2018.
USPTO. Decision to Institute Post Grant Review in PGR2018-00047, Sep. 18, 2018.
USPTO. Decision to Institute Post Grant Review in PGR2018-00029, Aug. 20, 2018.
USPTO. Decision on Request for Rehearing in PGR2018-00029, Sep. 18, 2018.
USPTO. Conduct of the Proceeding in PGR2018-00029, Sep. 11, 2018.
GREE. Patent Owner's Request for Reconsideration of Decision Instituting PGR in PGR2018-00029, Sep. 4, 2018.
Mullet, Kevin et al., "Designing Visual Interfaces". Case: PGR2018-00047, SunSoft Press, pp. 1-322, 1995.
GREE, Inc. "Patent Owner's Response". Case: PGR2018-00047, U.S. Pat. No. 9,770,659. pp. 1-88, Dec. 5, 2018.
GREE, Inc. "Patent Owner's Response". Case: PGR2018-00029, U.S. Pat. No. 9,636,583. pp. 1-82, Nov. 20, 2018.
Prosecution History of U.S. Pat. No. 9,770,659, 308 pages.
USPTO Memorandum on Recent Subject Matter Eligibility Decisions dated May 19, 2016, 2 pages.
USPTO Memorandum on Recent Subject Matter Eligibility Decisions dated Nov. 2, 2016, 4 pages.
Prosecution History of U.S. Appl. No. 15/686,268, 234 pages.
"Microsoft Computer Dictionary", Microsoft Press 4th Ed., 1999, 3 pages.
Prosecution History of U.S. Pat. No. 9,457,273, 350 pages.
Prosecution History of U.S. Pat. No. 9,636,583, 250 pages.
Jennifer R. Bush, "Petition for Post Grant Review of U.S. Pat. No. 9,770,659,"dated Mar. 8, 2018, 65 pages.
Declaration of David Crane for Case: PGR2018-00047, U.S. Pat. No. 9,636,659 dated Jun. 21, 2018, 26 pages.
John C. Alemanni, "Patent Owner's Preliminary Response" for Case: PGR2018-00047, U.S. Pat. No. 9,636,659 dated Jun. 22, 2018, 62 pages.
File History of U.S. Appl. No. 15/686,268, 172 pages.
"Guidance on the Impact of SAS on AIA Trial Proceedings," USPTO, Apr. 2, 2018, 2 pages.
Petitioner's Reply to Patent Owner's Preliminary Response dated Jun. 15, 2018, of U.S. Pat. No. 9,636,583.
Patent Owner's Sur-Reply to Petitioner's Reply to Preliminary Response dated Jun. 22, 2018, of U.S. Pat. No. 9,636,583.
Report of Reconsideration by Examiner before Appeal dated Apr. 26, 2018, from corresponding Japanese Application No. 2017-026791 with an English translation, 2 pages.
YouTube Video Screen Shots, "Kings and Legends Gameplay," divided into four (4) segments, dated Dec. 21, 2012.
YouTube Video Screen Shots, "Genpei iPhone," divided into eight (8) segments, dated Dec. 16, 2011.
YouTube Video Screen Shots, "Duel Monsters," divided into six (6) segments, dated Mar. 10, 2013.
Petition for Post Grant Review of U.S. Pat. No. 9,636,583 along with Exhibits 1-8, divided into two (2) segments, 1,106 pages.
Patent Owner's Preliminary Response dated May 23, 2018, along with Exhibits 1-3, 175 pages.
"Yu-Gi-Oh! Duel Monsters II Practical Guide," Konami, undated, 27 pages, 2001.
"Of the End," Sega, ryu-ga-gotoku.com, 2011, two pages.
Final Rejection dated Nov. 7, 2017, of corresponding Japanese Application No. 2017-026791, along with an English translation.
Japanese Office Action dated Jul. 4, 2017, of corresponding Japanese Application No. 2017-026791 with English translation.
Japanese Office Action dated Apr. 11, 2017, of corresponding Japanese Application No. 2017-026791 with English translation.
R. Knizia, "Samurai Invasion," Online, iPhone AC, Jan. 2, 2011, pp. 1-11, https://web.archive.org/web/2110102190809/http://iphoneac.com/samurai.html.
Culdcept mobile [online], Top Hundreds of Mobile games, Apr. 29, 2016 pp. 1-2, https://web.archive.org/web/20060429142038/http://contents.dwango.jp/games/culdcept/battle.html.

(56) References Cited

OTHER PUBLICATIONS

Notice of Reasons for Refusal dated Jul. 12, 2016, of corresponding Japanese Application No. 2014-042491 with English translation.
Japanese Office Action dated Nov. 29, 2016, of corresponding Japanese Application No. 2016-190205 with English translation.
Mar. 12, 2019 Office Action issued in Japanese Patent Application No. 2018-018718.
Mar. 19, 2019 Office Action issued in Japanese Patent Application No. 2017-026791.
GREE, Inc. Patent Owner's Sur-Reply in PGR2018-00047, Apr. 8, 2019.
Supercell Oy. Petitioner's Reply to Patent Owner's Response in PGR2018-00047, Mar. 7, 2019.
GREE, Inc. Patent Owner's Sur-Reply in PGR2018-00029, Apr. 8, 2019.
Supercell Oy. Petitioner's Reply to Patent Owner's Response in PGR2018-00029, Mar. 7, 2019.
Steve Butts. "BattleForge Review: An Intriguing Idea That's Less Than the Sum of Its Parts", <https://web.archive.org/web/20130223062022/https://www.ign.com/articles/2009/04/01/battleforge-review> (Feb. 23, 2013).
Compile Heart. "Monster Monpiece", <https://web.archive.org/web/20130110022744/http://www.compileheart.com/mon-mon/html/> (Jan. 10, 2013).
Mojang. "Game: What Is Scrolls?", <http://scrolls.com/game> (Oct. 29, 2012).
GuideScroll. "Kings & Legends FAQ", <https://web.archive.org/web/20130529185927/https:/guidescroll.com/2013/03/kings-legends> (Mar. 13, 2013).
Kings & Legends. "Kings & Legends: free online Trading Card Game", <https://web.archive.org/web/20130117005651/https:/kingsandlegends.com/> (Jan. 17, 2013).
Forbes. "Kings and Legends Is Pay-to-Win. It'S Also a Metric Ton of Fun", <https://web.archive.org/web/20130120052532/https://www.forbes.com/sites/danieltack/2013/01/16/kings-and-legends-is-pay-to-win-its-also-a-metric-ton-of-fun/> (Jan. 20, 2013).
Wikipedia. "King and Legends: Main Page", <https://web.archive.org/web/20130403074124/http:/wiki.kingsandlegends.com/index.php/Main_Page> (Apr. 3, 2013).
Me and the Computer Blogspot. "NanoStar Siege Basic Strategy Guide", <https://web.archive.org/web/20100729160311/http:/meandthecomputer.blogspot.com/2010/07/nanostar-siege-basic-strategy-guide.html> (Jul. 29, 2010).
Gamezebo. "NanoStar Siege Review", <https://www.gamezebo.com/2010/04/14/nanostar-siege-review/> (Apr. 14, 2010).
FREE2PLAY Multiplayer Online Games. "NanoStar Siege", <http://free2playmultiplayeronlinegames.blogspot.com/2011/08/nanostar-siege.html> (Aug. 12, 2011).
PlayStation. "PlayStation Vita", <https://web.archive.org/web/20111015122004/http:/uk.playstation.com/psvita/?tab=specifications> (Oct. 15, 2011).
Wikipedia. "Patch Notes from Kings and Legends", <https://web.archive.org/web/20130118033822/http:/wiki.kingsandlegends.com/index.php/Patch_notes> (Jan. 18, 2013).
Wikipedia. "PvP from Kings and Legends", <https://web.archive.org/web/20121128035825/http:/wiki.kingsandlegends.com:80/index.php/PvP> (Nov. 28, 2012).
Mojang. "Let's play Scrolls together (again)!", <https://web.archive.org/web/20121029121849/http://scrolls.com/2012/10/a-note-about-posting-videos> (Oct. 29, 2012).
SEGA Blog. "Samurai Bloodshow Releases on iOS", <https://web.archive.org/web/20111031232723/http:/blogs.sega.com/2011/09/01/samurai-bloodshow-releases-on-ios/> (Oct. 31, 2011).
Supercell, Invalidity Contentions in Civil Action No. 2:19-cv-00237-JRG-RSP (Dec. 6, 2019).
Supercell, Exhibit A-4, Claim Chart on NanoStar in Civil Action No. 2:19-cv-00237-JRG-RSP (Dec. 6, 2019).
Supercell, Exhibit A-3, Claim Chart on Monster Monpiece in Civil Action No. 2:19-cv-00237-JRG-RSP (Dec. 6, 2019).
Supercell, Exhibit A-2, Claim Chart on Kings & Legends in Civil Action No. 2:19-cv-00237-JRG-RSP (Dec. 6, 2019).
Supercell, Exhibit A-1, Claim Chart on BattleForge Game in Civil Action No. 2:19-cv-00237-JRG-RSP (Dec. 6, 2019).
Supercell, Exhibit A-5, Claim Chart on Prime World Defenders in Civil Action No. 2:19-cv-00237-JRG-RSP (Dec. 6, 2019).
Supercell, Exhibit A-6, Claim Chart based on U.S. Pat. No. 7,371,165 in Civil Action No. 2:19-cv-00237-JRG-RSP (Dec. 6, 2019).
Supercell, Exhibit A-7, Claim Chart based on U.S. Pat. No. 6,419,584 in Civil Action No. 2:19-cv-00237-JRG-RSP (Dec. 6, 2019).
Supercell, Exhibit A-8, Claim Chart on Samurai Bloodshow by Sega in Civil Action No. 2:19-cv-00237-JRG-RSP (Dec. 6, 2019).
Supercell, Exhibit A-9, Claim Chart on Scrolls Caller's Bane in Civil Action No. 2:19-cv-00237-JRG-RSP (Dec. 6, 2019).
Adweek. "Digital Chocolate Continues NanoVerse Assault on Facebook with Launch of Siege", <https://www.adweek.com/digital/nanostar-siege-raids-facebook/> (Mar. 29, 2010).
PTAB Final Written Decision in PGR2018-00029, Aug. 14, 2019.
PTAB Final Written Decision in PGR2018-00047, Sep. 6, 2019.
GREE, Inc. Patent Owner's Notice of Appeal in PGR2018-00029, Oct. 15, 2019.
GREE, Inc. Patent Owner's Notice of Appeal in PGR2018-00047, Nov. 7, 2019.
Supercell OY, Defendant's Ineligibility Contentions in Civil Action No. 2:19-cv-00237-JRG-RSP, Nov. 13, 2019.
Supercell OY, Defendant's Answer in Civil Action No. 2:19-cv-00237-JRG-RSP, Sep. 12, 2019.
Supercell, "Petition for Post Grant Review" in Post Grant Review PGR2020-00043 (Mar. 24, 2020).
Stephen Lane, "Declaration" in Post Grant Review PGR2020-00043 (Mar. 24, 2020).
YouTube, "Kings and Legends Gameplay" <https://www.youtube.com/watch?v=3KnggL2IGN8> (Dec. 21, 2012).
Forbes, "Kings and Legends Is Pay-to-Win. It's Also a Metric Ton of Fun" <https://web.archive.org/web/20130120052532/https://www.forbes.com/sites/danieltack/2013/01/16/kings-and-legends-is-pay-to-win-its-also-ametric-ton-of-fun/> (Jan. 16, 2013).
GuideScroll, "Kings & Legends FAQ" <https://web.archive.org/web/20130529185927/https://guidescroll.com/2013/03/kings-legends-faq/> (May 29, 2013).
Engadget, "Engadget's laptop buyer's guide: spring 2013 edition" <https://web.archive.org/web/20130430044044/https://www.engadget.com/2013/04/26/engadget-laptop-buyers-guide-spring-2013> (Aug. 26, 2013).
The Seattle Times, "Professor's Game Casts Magic Spell on Players" <https://archive.seattletimes.com/archive/?date=19931118&slug=1732576> (Nov. 18, 1993).
Business Wire, "Pokemon USA, Inc. and Wizards of the Coast, Inc. Resolve Dispute" <https://www.businesswire.com/news/home/20031229005065/en/Pokemon-USA-Wizards-Coast-Resolve-Dispute> (Dec. 29, 2003).
Moby Games, "Magic: The Gathering—Duels of the Planeswalkers" <https://web.archive.org/web/20101002224233/https://www.mobygames.com/game/windows/magic-the-gathering-duels-of-theplaneswalkers/reviews/reviewerId,112363/> (Oct. 2, 2010).
IGN, "Pokemon Trading Card Game" <https://web.archive.org/web/20121016233856/http://www.ign.com/articles/2000/04/11/pokemon-trading-card-game> (Apr. 10, 2000).
Eurogamer, "Battleforge Review" <https://web.archive.org/web/20090402084030/https://www.eurogamer.net/articles/battleforge-review> (Apr. 2, 2009).
YouTube, "BattleForge Gameplay" <https://www.youtube.com/watch?v=CqJoJ1mdgPI> (Dec. 14, 2010).
IGN, "Samurai Bloodshow Review" <https://web.archive.org/web/20121103025545/https://www.ign.com/articles/2011/09/15/samurai-bloodshow-review-ios> (Nov. 3, 2012).
YouTube, "Samurai Bloodshow—iPad 2—US—HD Gameplay Trailer" <https://www.youtube.com/watch?v=ip3FcZmp3Kg> (Sep. 1, 2011).
PlayStation, "PlayStation Network" <https://web.archive.org/web/20120308142700/http://us.playstation.com/psn/> (Mar. 8, 2012).
Xbox, "Xbox Live" <https://web.archive.org/web/20120204175724/xbox.com/en-US/live> (Feb. 4, 2012).

(56) References Cited

OTHER PUBLICATIONS

PR Newswire, "Nintendo's Wi-Fi Service Logs Its 1 Millionth Player More Than 27 Million Connections Have Been Made Around the World," PR Newswire Europe Limited (Mar. 7, 2006).
Scott D. Baker, "Declaration" in Post Grant Review PGR2020-00043 (Mar. 24, 2020).
Chih-Han Hsu, "Declaration" in Post Grant Review PGR2020-00043 (Mar. 24, 2020).
Clash Royale, "Clash Royale: Now available everywhere" <https://web.archive.org/web/20160305080410/https://clashroyale.com/blog/news/clash-royale-global-launch> (Mar. 5, 2016).
Clash Royale, "Soft Launch Announcement: Clash Royale Release in Select Countries" <https://web.archive.org/web/20160416151818/https://clashroyale.com/> (Jan. 1, 2016).
Gree, Exhibit A to "Infringement Contentions" in Civil Action No. 19-cv-00237 (Sep. 18, 2019).
YouTube, "Clash Royale: Gameplay First Look" <https://www.youtube.com/watch?v=_hNxfiXmeAE> (Jan. 3, 2016).
Supercell, "Deposition of David Crane" in PGR2018-00047 (Feb. 28, 2019).
GREE, "First Amended Complaint" in Civil Action No. 19-cv-00237 (Jul. 1, 2019).
History-Computer.com, "Spacewar" <https://web.archive.org/web/20150315144452/https://historycomputer.com/ModernComputer/Software/Spacewar.html> (Mar. 15, 2015).
Wu et al., "Why They Enjoy Virtual Game Worlds? An Empirical Investigation" Journal of Electronic Commerce Research, vol. 9, No. 3 (2008—year of publication sufficiently early that the month is not relevant).
Tom's Guide, "Download Kings and Legends 1.0.2 for Android" <http://web.archive.org/web/20170430001555/https://downloads.tomsguide.com/Kings-and-Legends,0301-57571.html> (Apr. 30, 2017).
Business Insider Australia, "TIMELINE: The 40-Year Evolution of Video Game Consoles" <https://www.businessinsider.com.au/without-these-game-consoles-wewouldnt-be-playing-angry-birds-on-our-iphones-2012-8#nintendo-dualscreen-ds-10> (Aug. 18, 2012).
Supercell Oy, Petitioner's Reply to Patent Owner's Preliminary Response in PGR2020-00043, Aug. 3, 2020.
Scott McKeown, "Congress Urged to Investigate PTAB Discretionary Denials", Patent Post-Grant, Supercell Ex. 1048, *Supercell Oy v. Gree, Inc.* in PGR2020-00043, pp. 1-4, Jun. 30, 2020.
Scott McKeown, "District Court Trial Dates Tend to Slip After PTAB Discretionary Denials", Patent Post-Grant, Supercell Ex. 1049, *Supercell Oy v. Gree, Inc.* in PGR2020-00043, pp. 1-3, Jul. 24, 2020.
GREE, Patent Owner's Sur-Reply to Petitioner's Reply to Patent Owner's Preliminary Response in PGR2020-00043, Aug. 13, 2020.
Sep. 29, 2020 Office Action issued in Japanese Patent Application No. 2019-192400.
GREE, "Reply to Defendant Supercell Oy's Opposition to Motion to Strike Amended Invalidity Contentions" in Civil Action No. 2:19-cv-00237-JRG-RSP (Aug. 26, 2020).
PTAB, "Decision Denying Institution of Post-Grant Review" in PGR2020-00043 (Oct. 14, 2020).
Roy S. Payne, "Memorandum Order" in Civil Action No. 2:19-cv-00237-JRG-RSP (Sep. 24, 2020).
Supercell, "Petitioner's Request for Rehearing" in PGR2020-00043 (Nov. 13, 2020).
Supercell, "Opposition to Plaintiff's Motion to Strike Amended Invalidity Contentions" in Civil Action No. 2:19-cv-00237-JRG-RSP (Aug. 18, 2020).
Supercell, Exhibit A-10 to Amended Invalidity Contentions, Claim Chart based on U.S. Appl. No. 10,328,346 in Civil Action No. 2:19-cv-00237-JRG-RSP (Jul. 1, 2020).
GREE, "Plaintiff's Motion to Strike Amended Invalidity Contentions" in Civil Action No. 2:19-cv-00237-JRG-RSP (Jul. 28, 2020).
Supercell, "Defendant Supercell Oy's Amended Invalidity Contentions and Disclosures Under Local Patent Rule 3-6" in Civil Action No. 2:19-cv-00237-JRG-RSP (Jul. 1, 2020).
Supercell OY, Invalidity Expert Report of Stacy Friedman in Civil Action No. 2:19-cv-00237-JRG-RSP (Nov. 2, 2020).
Gree, Rebuttal Expert Report of Dr. Robert Akl, D.SC. Regarding Validity of U.S. Pat. No. 10,328,346 and 10,335,689 in Civil Action No. 2:19-cv-00237-JRG-RSP (Nov. 24, 2020).

\* cited by examiner

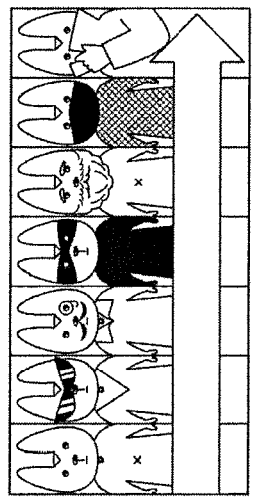
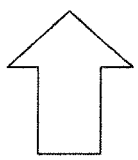
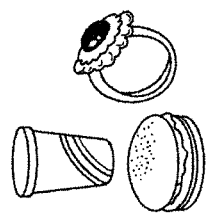
FIG. 10

STORAGE MEDIUM STORING GAME PROGRAM, GAME PROCESSING METHOD, AND INFORMATION PROCESSING APPARATUS

CROSS REFERENCE TO RELATED APPLICATIONS

This application is a continuation of U.S. patent application Ser. No. 16/277,144 filed Feb. 15, 2019, which is a continuation of U.S. patent application Ser. No. 15/686,268 filed Aug. 25, 2017, which is a continuation of U.S. patent application Ser. No. 15/391,123, filed Dec. 27, 2016, which is a continuation of U.S. patent application Ser. No. 15/253,964, filed Sep. 1, 2016, now U.S. Pat. No. 9,636,583, which is a continuation of U.S. patent application Ser. No. 14/291,358, filed May 30, 2014, now U.S. Pat. No. 9,457,273, that claims the benefit of JP 2013-116039, filed on May 31, 2013, JP 2013-268385, filed on Dec. 26, 2013, and JP 2014-042491, filed on Mar. 5, 2014, the entire contents of the above applications being hereby incorporated by reference.

TECHNICAL FIELD

This disclosure relates to a storage medium storing a game program, a game processing method, and an information processing apparatus and, in particular, to a storage medium storing a game program and a game processing method of a game in which a plurality of characters battle against each other, and an information processing apparatus that controls the game.

BACKGROUND

In recent years, with the spread of electronic apparatuses such as smart phones and tablets, games played on these electronic apparatuses have been actively developed.

As an example of such a game, there is a card game in which the user plays against other users or against the computer using cards collected in the game.

Japanese Unexamined Patent Application Publication No. 2007-252696 discloses a technique regarding the card game described above. According to that technique, the user configures a deck with cards used in a play which is selected from a plurality of cards that the user owns, and plays a rock-paper-scissors game or the like with an opponent using the deck.

Such a card game system is familiar to many users today. However, since the use of a two-dimensional card in the battle scene is sometimes boring, there have been calls for improvement.

It could therefore be helpful to provide a storage medium storing a game program and a game processing method of a game that gives a user a high visual effect, and an information processing apparatus that controls the game.

SUMMARY

I provide:

(1) A non-transitory computer readable recording medium storing game program code instructions for a game in which a first user and a second user do battle, and when the game program code instructions are executed by a computer, the game program code instructions cause the computer to perform a data storage function of storing a first panel data that includes a plurality of panels associated with the first user to a storage unit; a control function of receiving information regarding a selection by the first user, the selection being for one or more panels indicating characters to be disposed in one or more divisions of a game display screen including a display region formed by the divisions; the data storage function further stores the panel associated with information of motion to the storage unit, and the control function transmits information for displaying the panel as a moving character according to the information of motion associated with the panel when the panel is disposed in a target division;

(2) The recording medium according to (1), wherein the control function disposes the panel in the target division or receives an instruction for disposing the panel in the target division when the panel selected by the first user is allowed to be disposed in the target division;

(3) The recording medium according to (1), wherein the data storage function further stores the panel associated with information of text to be displayed to overlap the panel to the storage unit, and the control function transmits information for displaying the game display screen in which the panel overlapped with the text is disposed in the target division on the basis of the panel selected by the first user and the information of text to be displayed to overlap the panel;

(4) The recording medium according to (1), wherein the data storage function further stores the panel associated with information of cost points that is reduced by disposing the panel to the storage unit, the data storage function compares the information of cost points associated with the panel selected by the first user and information of possessing cost points associated with the first user when the control function receives information regarding the selection by the first user, and stores a value obtained by subtracting a value according to the information of cost points from a value according to the information of possessing cost points by updating as the information of possessing cost point to the storage unit when the value according to the information of possessing cost points is greater than or equal to the value according to the information of cost points as a result of above comparison, and the control function transmits information for displaying the value according to the updated information of possessing cost points in the game display screen;

(5) The recording medium according to (1), wherein the data storage function further stores the panel associated with information of effect points that indicates effect on a character of the second user by disposing the panel to the storage unit, the data storage function compares the information of effect points associated with the panel selected by the first user and information of hit points associated with the character of the second user when the control function receives information regarding the selection by the first user, and stores a value obtained by subtracting a value according to the information of effect points from a value according to the information of hit points by updating as the information of hit point to the storage unit when the value according to the information of hit points is greater than or equal to the value according to the information of effect points as a result of above comparison, and the control function transmits information for displaying the value according to the updated information of hit points in the game display screen;

(6) A game processing method for a game in which a first user and a second user do battle, and when executed by a computer, the game processing method causes the computer to perform a data storage step of storing a first panel data that includes a plurality of panels associated with the first user to a storage unit; a control step of receiving information regarding a selection by the first user, the selection being for one or more panels indicating characters to be disposed in one or more divisions of a game display screen including a display region formed by the divisions; the data storage step further stores the panel associated with information of motion to the storage unit, and the control step transmits information for displaying the panel as a moving character according to the information of motion associated with the panel when the panel is disposed in a target division;

(7) A server apparatus that controls a game in which a first user and a second user do battle, including a data storage unit that stores a first panel data that includes a plurality of panels associated with the first user; a control unit that receives information regarding a selection by the first user, the selection being for one or more panels indicating characters to be disposed in one or more divisions of a game display screen including a display region formed by the divisions; the data storage unit further stores the panel associated with information of motion, and the control unit transmits information for displaying the panel as a moving character according to the information of motion associated with the panel when the panel is disposed in a target division;

(8) A non-transitory computer readable recording medium storing game program code instructions for a game in which a first user and a second user do battle, and when the game program code instructions are executed by a computer, the game program code instructions cause the computer to perform a data storage function of storing a first panel data that includes a plurality of panels associated with the first user to a storage unit; a panel selection function of receiving a selection by the first user, the selection being for one or more panels indicating characters to be disposed in one or more divisions of a game display screen including a display region formed by the divisions; a panel layout function of disposing the panels in the divisions on the basis of the selection received by the panel selection function; and a screen display control function of controlling the game display screen on a screen display unit on the basis of information regarding the layout by the panel layout function; the data storage function further stores the panel associated with information of motion to the storage unit, and the screen display control function controls for displaying the panel as a moving character according to the information of motion associated with the panel when the panel is disposed in a target division;

(9) The recording medium according to (8), wherein the panel layout function disposes the panel in the target division or receives an instruction for disposing the panel in the target division when the panel selected by the first user is allowed to be disposed in the target division;

(10) The recording medium according to (8), wherein the data storage function further stores the panel associated with information of text to be displayed to overlap the panel to the storage unit, and the screen display control function displays the game display screen in which the panel overlapped with the text is disposed in the target division on the basis of the panel selected by the first user and the information of text to be displayed to overlap the panel;

(11) The recording medium according to (8), wherein the data storage function further stores the panel associated with information of cost points that is reduced by disposing the panel to the storage unit, the data storage function compares the information of cost points associated with the panel selected by the first user and information of possessing cost points associated with the first user when the panel selection function receives information regarding the selection by the first user and stores a value obtained by subtracting a value according to the information of cost points from a value according to the information of possessing cost points by updating as the information of possessing cost point to the storage unit when the value according to the information of possessing cost points is greater than or equal to the value according to the information of cost points as a result of above comparison, and the screen display control function controls for displaying the value according to the updated information of possessing cost points in the game display screen;

(12) The recording medium according to (8), wherein the data storage function further stores the panel associated with information of effect points that indicates effect on a character of the second user by disposing the panel to the storage unit, the data storage function compares the information of effect points associated with the panel selected by the first user and information of hit points associated with the character of the second user when the panel selection function receives information regarding the selection by the first user, and stores a value obtained by subtracting a value according to the information of effect points from a value according to the information of hit points by updating as the information of hit point to the storage unit when the value according to the information of hit points is greater than or equal to the value according to the information of effect points as a result of above comparison, and the screen display control function controls for displaying the value according to the updated information of hit points in the game display screen;

(13) The recording medium according to (8), wherein the receiving of the selection by the panel selection function is performed on the basis of information inputted from a touch panel display;

(14) A game processing method for a game in which a first user and a second user do battle, and when executed by a computer, the game processing method causes the computer to perform a data storage step of storing a first panel data that includes a plurality of panels associated with the first user to a storage unit; a panel selection step of receiving a selection by the first user, the selection being for one or more panels indicating characters to be disposed in one or more divisions of a game display screen including a display region formed by the divisions; a panel layout step of disposing the panels in the divisions on the basis of the selection received by the panel selection step; and a screen display control step of controlling the game display screen on a screen display unit on the basis of information regarding the layout by the panel layout step; the data storage step further stores the panel associated with information of motion to the storage unit, and the screen display control step controls for displaying the panel as a moving character according to the information of motion associated with the panel when the panel is disposed in a target division;

(15) An information processing apparatus that controls a game in which a first user and a second user do battle, including a data storage unit that stores a first panel data that includes a plurality of panels associated with the first user; a panel selection unit that receives a selection by the first user, the selection being for one or more panels indicating characters to be disposed in one or more divisions of a game display screen including a display region formed by the divisions; a panel layout unit that disposes the panels in the divisions on the basis of the selection received by the panel selection unit; and a screen display control unit that controls the game display screen on a screen display unit on the basis of information regarding the layout by the panel layout unit; the data storage unit further stores the panel associated with information of motion, and the screen display control unit controls for displaying the panel as a moving character according to the information of motion associated with the panel when the panel is disposed in a target division.

According to the storage medium, the game processing method, and the information processing apparatus, it is possible to provide a game that gives a user a high visual effect.

BRIEF DESCRIPTION OF THE DRAWINGS

FIG. 10 is a schematic diagram explaining an example of the game.

DETAILED DESCRIPTION

A game program according to examples will be described with reference to the accompanying diagrams.

The game program is for a game in which the first and second characters battle against each other, and causes a computer to realize a data storage function, a panel selection function, a panel layout function, a screen display control function, and an emphasized display function.

Figure 1:
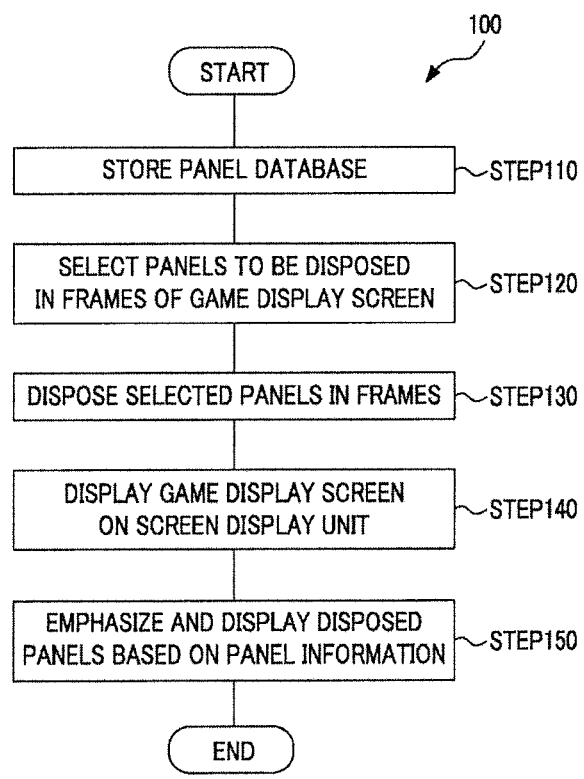
FIG. 1 is a flowchart showing an example of a game program.

FIG. 1 is a flowchart showing an example of a game program 100.

Using the data storage function, a first panel database including a plurality of panels that the first character possesses and a second panel database including a plurality of panels that the second character possesses are stored (STEP 110). This function can be realized by a data storage unit to be described later.

Using the panel selection function, panels to be disposed in frames of the game display screen including a battle display region formed by one or more frames are selected from the first panel database including a plurality of panels that the first character possesses and the second panel database including a plurality of panels that the second character possesses (STEP 120). This function can be realized by a panel selection section to be described later.

Using the panel layout function, the panels selected by the panel selection function are disposed in the frames (STEP 130). This function can be realized by a panel layout section to be described later.

Using the screen display control function, the game display screen is displayed on a screen display unit (STEP 140). The screen display unit receives a signal output from a screen display control section of an information processing apparatus, which will be described later. For example, a display device provided in a user terminal can be used. In addition, it is possible to use a touch panel type display that also serves as an input unit to be described later. This function can be realized by the screen display control section to be described later.

Using the emphasized display function, the panel disposed by the panel layout function is emphasized and displayed on the screen display unit based on the panel information indicating the characteristics of the panel (STEP 150). "Emphasized display" refers to displaying a specific panel of the panels disposed in the frames noticeably compared with the other panels. As examples of emphasized display, it is possible to display a movie or display a frame to surround the panel. This function can be realized by an emphasized display section to be described later.

The game program can be executed in a server apparatus or a user terminal to perform each process of the game described above. In addition, the game program can be provided in a state where the game program is recorded on a computer-readable recording medium. Recording media is not particularly limited as long as the recording media can be read by the computer such as a CD-ROM and a DVD.

Next, a game processing method according to an example will be described.

The game processing method is for a game in which the first and second characters battle against each other, and includes a data storage step, a panel selection step, a panel layout step, a screen display control step, and an emphasized display step.

In the data storage step, a first panel database including a plurality of panels that the first character possesses and a second panel database including a plurality of panels that the second character possesses are stored. This step can be processed by the data storage unit to be described later.

In the panel selection step, panels to be disposed in frames of the game display screen including a battle display region formed by one or more frames are selected from the first and second panel databases. This step can be processed by the panel selection section to be described later.

In the panel layout step, the panels selected in the panel selection step are disposed in the frames. This step can be processed by the panel layout section to be described later.

In the screen display control step, the game display screen is displayed on the screen display unit. This step can be processed by the screen display control section to be described later.

In the emphasized display step, the panel disposed in the panel layout step is emphasized and displayed on the screen display unit based on the panel information indicating the characteristics of the panel. This step can be processed by the emphasized display section to be described later.

Next, an information processing apparatus according to an example will be described with reference to the accompanying diagrams.

Figure 2:
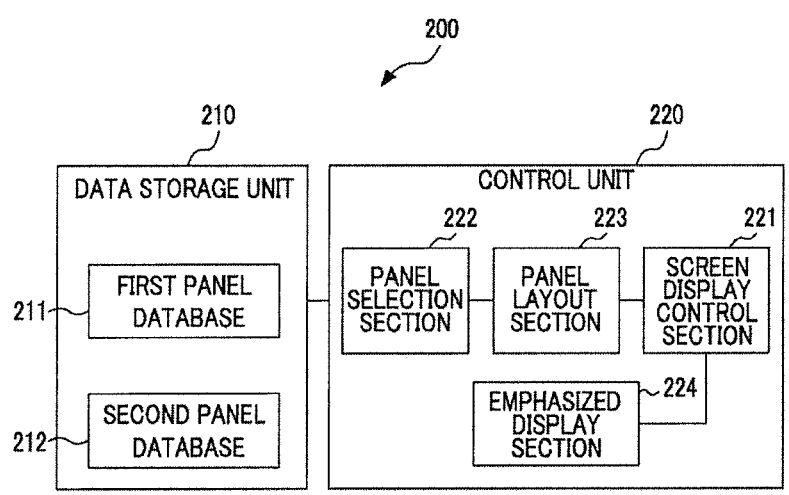
FIG. 2 is a block diagram showing an example of an information processing apparatus.

FIG. 2 is a block diagram schematically showing an example of the information processing apparatus.

An information processing apparatus 200 controls a game in which the first and second characters battle against each other, and includes a data storage unit 210 and a control unit 220.

The data storage unit 210 stores a first panel database 211 that includes a plurality of panels that the first character possesses, and a second panel database 212 that includes a plurality of panels that the second character possesses.

The control unit 220 includes: a screen display control section 221 that displays a game display screen that includes a battle display region formed by one or more frames on the screen display unit; a panel selection section 222 that selects panels to be disposed in the frames of the battle display region, from the first panel databases 211 and second panel databases 212; a panel layout section 223 that disposes the panels selected by the panel selection section 222 in the frames; and an emphasized display section 224 that emphasizes and displays the panels disposed by the panel layout section 223 on the screen display unit based on the panel information indicating the characteristics of the panels. As the screen display unit, a display device and the like can be mentioned. In addition, it is possible to use a touch panel type display that also serves as an input unit to be described later.

A first panel group configured to include a plurality of panels that the first character possesses is stored in the first panel database 211.

A second panel group configured to include a plurality of panels that the second character possesses is stored in the second panel database 212.

Although not shown in the diagram, the information processing apparatus 200 can include an input receiving unit that receives an input to give an instruction to the control unit 220. As means for the input received by the input receiving unit, everything that the information processing apparatus operated by the user may have such as buttons, a keyboard or a mouse, is included. In addition, as described above, it is also possible to use a touch panel type input.

While the information processing apparatus 200 can be a server apparatus or a user terminal such as a mobile phone or a smart phone, the information processing apparatus 200 can also be configured to include a user terminal and a server apparatus.

Figure 3:
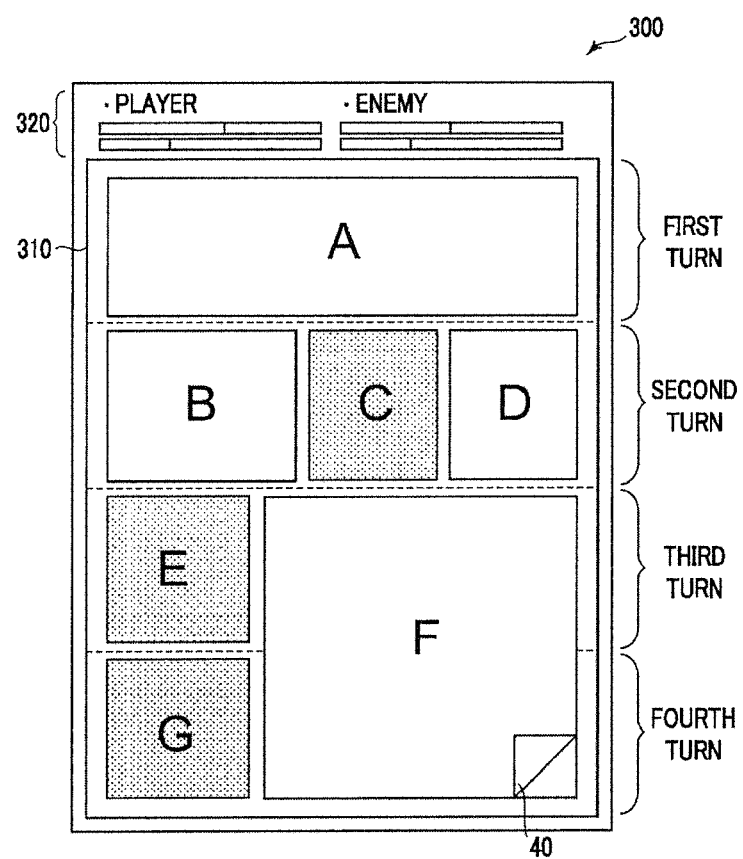
FIG. 3 is a schematic diagram showing an example of a game display screen.

FIG. 3 is a diagram schematically showing an example of a game display screen 300 displayed on the screen display unit. As shown in FIG. 3, the game display screen 300 is a game display screen of a game in which the first and second characters battle against each other. The game display screen 300 includes a battle display region 310 formed by one or more frames (in FIG. 3, frames A to G).

As shown in FIG. 3, a character (PLAYER) that the user uses can be set as the first character, and a character (ENEMY) that the computer uses can be set as the second character. Alternatively, although not shown in the diagram, the character (PLAYER) that the user uses can be set as the first character, and a character (FRIEND) that another user uses can be set as the second character.

Panels selected from the first panel group configured to include a plurality of panels that the first character possesses and the second panel group configured to include a plurality of panels that the second character possesses are disposed in the frames A to G. In the example shown in FIG. 3, panels selected from the first panel group are disposed in the frames A, B, D, and F, and panels selected from the second panel group are disposed in the frames C, E, and G.

The emphasized display section 224 can execute the frames in predetermined order, and emphasize and display the panels disposed in the executed frames. The battle proceeds by executing the frames A to G in order of the frames A, B, C, D, E, F, and G.

That is, according to the example, the battle between the first and second characters proceeds in a format like a cartoon. Therefore, since the user can play the game with a sense of reading a cartoon, the visual effect that the user receives is greatly improved compared to known games.

In the game display screen 300, the battle can be performed based on the panel information regarding the panel that is emphasized and displayed by the emphasized display section 224. In this case, the panel information is assumed to include information regarding the size of the panel.

In addition, each panel described above can have an arbitrary size. In the example shown in FIG. 4, the game display screen 300 includes the battle display region 310 formed by frames H to O. In the battle display region 310 divided into cells of "4 columns×4 rows," each of panels disposed in the frames H and N has a size corresponding to four cells. Similarly, each of panels disposed in the frames J and O has a size corresponding to two cells, and each of panels disposed in the frames I, K, L, and M has a size corresponding to one cell.

Specifically, assuming that each row indicates a turn of a battle, the occupancy of action in each turn in horizontally long frames such as the frames H, N, and O, is high compared to that in horizontally short frames such as the frames I, J, K, L, and M. Accordingly, for example, in the first turn, only the action of the first player is performed.

In the vertically long frames such as the frames J and N, their actions are first performed in the previous turn. That is, for example, the frame J over the second and third turns is executed prior to the frame M disposed in the third turn.

That is, a panel the size of which is larger and presents at a position where a turn number is earlier leads a battle advantageously.

In addition, although the case where the battle proceeds from the upper left to the lower right is shown in the example described above, the battle may proceed from the upper right to the lower left.

As described above, it is preferable that the battle display region 310 be divided by the turn indicating the unit of the progress of the battle.

In addition, it is preferable that the shape of the panel be a rectangle. Panels can have various shapes such as a circle, a triangle, and a polygon, as well as the rectangle (including a square) such as a card in the related art.

In addition, it is preferable that the panel information described above include information on the capability of the panel. The capability information refers to information including attack, defense (avoidance), attributes, recovery, and skills to disable or replace the frame, for example. The effect of the capability is assumed to correspond to the size of the panel. Accordingly, the effect of the frames H and N with a large panel size is higher than that of the other frames.

Figure 5A:
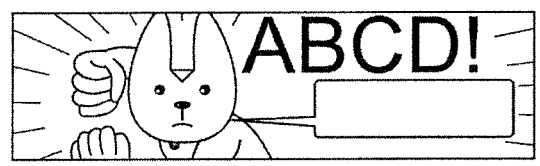
FIGS. 5A and 5B are schematic diagrams showing examples of a panel.
Figure 5B:
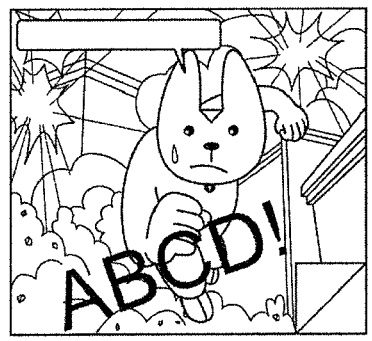

In addition, the panel can display a still image. As an example of the still image, as shown in FIGS. 5A and 5B, the action described above can be assumed to be expressed by way of illustration. FIG. 5A shows a still image of a panel with information of attack, and the illustration of the character to make a punch attack is drawn. Similarly, FIG. 5B shows a still image of a panel with information of defense, and the illustration of the character to avoid the attack of the enemy is drawn.

Preferably, these panels display a movie when the panels are emphasized and displayed. The movie is an animation that displays a plurality of still images consecutively.

Figure 6:
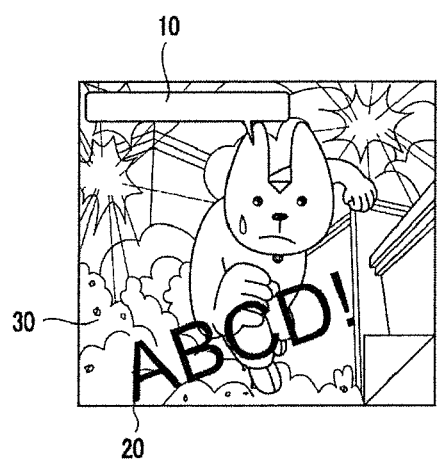
FIG. 6 is a schematic diagram showing an example of the panel.

FIG. 6 is a diagram schematically showing the panel of the frame F shown in FIG. 3. As shown in FIG. 6, it is preferable that the frame described above further have a text display portion 10 to display texts. Preferably, the text display portion 10 is displayed to overlap the panel disposed in the frame.

In addition to the panel described above, the frame preferably has a sound effect display portion 20 to display the texts showing the sound effect and/or an effect display portion 30 to display the effect. These portions can be displayed with a movie when the frame is emphasized and displayed. Due to these portions, the visual effect given to the user is further improved. In addition, the information processing apparatus operated by the user may be vibrated in conjunction with the sound effect display portion 20 or the like.

It is preferable that the panel, which is emphasized and displayed, be disposed in the middle of the game display screen 300. That is, the panel that is emphasized and displayed is displayed to zoom in. Accordingly, the visual effect given to the user is further improved.

In addition, it is preferable that the frame have a frame portion. In this frame portion, it is preferable that a frame portion of a frame in which the panel selected from the first panel group is disposed, and a frame portion of a frame in which the panel selected from the second panel group is disposed, be constructed in different colors. In this case, the panel of the first character and the panel of the second character can be visually easily distinguished.

In addition, as shown in FIG. 3, when the battle does not fit in the battle display region 310, it is preferable to provide a page turn portion 40 to proceed to the next page in a part of the frame executed at the end.

Preferably, the panels described above are automatically disposed in the frames by a computer. In this case, it is possible to save the time and effort taken for the user to dispose the panels. The battle result is preferably determined based on the panel information at a stage where the panels are disposed. In addition, it is also possible to change the battle result by changing the panel, which is displayed on the next page, by the operation (action for recovery or the like) of the user during the battle.

Figure 4:
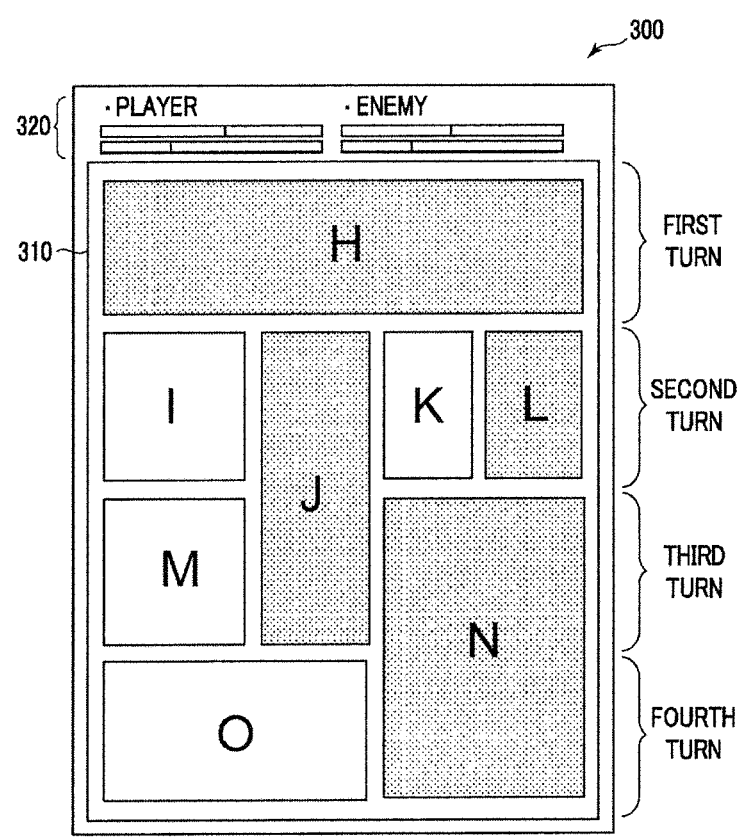
FIG. 4 is a schematic diagram showing an example of the game display screen.

In addition, as shown in FIGS. 3 and 4, the game display screen 300 can include a gauge display portion 320 to display the gauge of the character. This gauge shows hit points (hereinafter, described as HP) indicating the strength of the character or character points (hereinafter, described as CP) indicating the action force of the character. The HP is decreased by receiving the action of the attack of the opponent, and is increased by taking action for recovery. On the other hand, the CP is decreased by placing a large panel.

In FIG. 4, an example is shown in which all sizes of the panel objects can be expressed as an integral multiple of the cell. However, this disclosure is not limited to this.

Next, the basic flow of a game displayed on the game display screen will be described.

Figure 7:
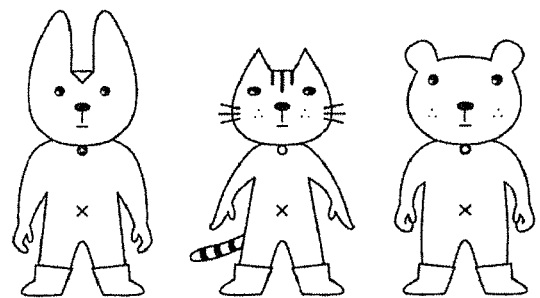
FIG. 7 is a schematic diagram explaining an example of the game.
Figure 8:
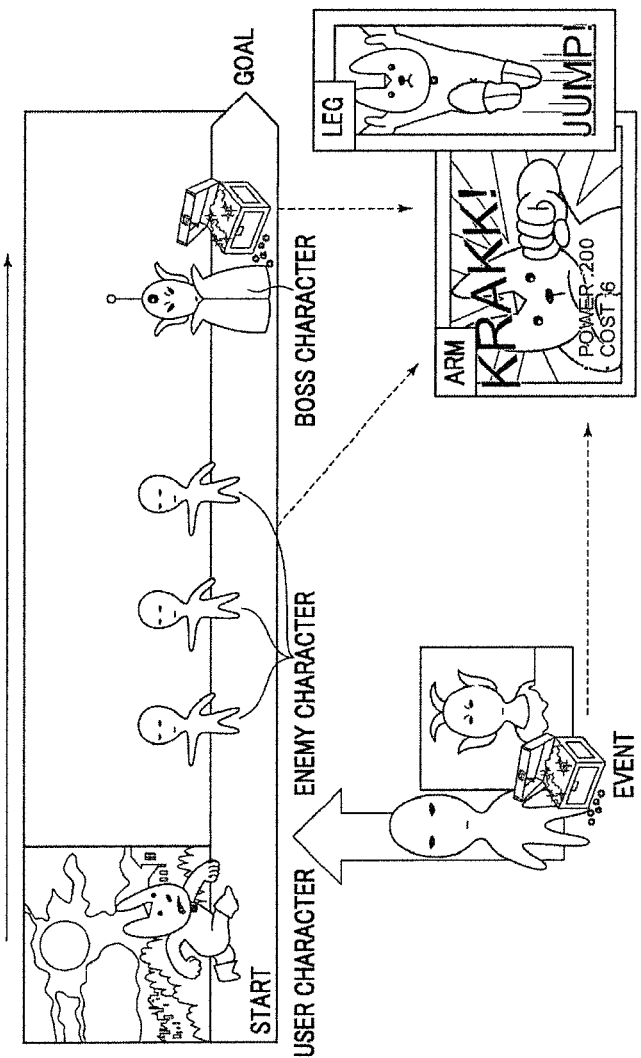
FIG. 8 is a schematic diagram explaining an example of the game.

A game described as an example herein has a main cycle and a sub-cycle. In the main cycle, as shown in FIG. 7, the user selects one character from a plurality of characters presented, and collects panels while advancing the quest. For a plurality of characters, it is possible to set the characteristics such as power type, speed type, stamina type and balanced type. FIG. 8 shows an example of the quest and the character selected by the user does battle with a boss character after a battle with a plurality of enemy characters. A panel can be acquired as a reward for the battle with the enemy characters and the boss character. In addition, it is also possible to acquire the panel in a specific event or the like. Thus, the user acquires the panel by advancing the game.

Figure 9:
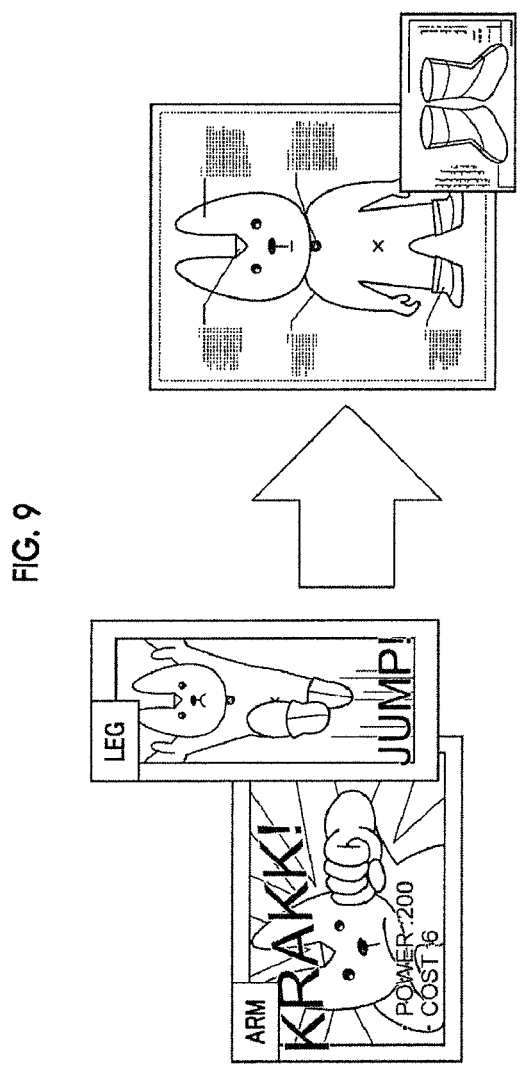
FIG. 9 is a schematic diagram explaining an example of the game.

Then, in the sub-cycle, the user can use the acquired panel to strengthen the deck for the battle or can use the acquired panel to develop a character. Developing the character refers to combining the character selected by the user with the acquired panel. As shown in FIG. 9, panels are used to strengthen each part (body, arms, legs, skill, and the like) of the body of the character. For example, a panel with information of the strength is used to strengthen the body of the character, a panel with information of the attack is used to strengthen the arms of the character, a panel with information of the defense is used to strengthen the legs of the character, and a panel with information of special technique effects during the battle is used to reinforce the skills of the character. In addition, a setting to make it possible to select a larger number of other characters or to use a stronger panel as the level of the character rises can also be made.

As shown in FIG. 10, as a reward for the battle or the event, there is an evolution material in addition to the panel. By using this evolution material, the selected character can be evolved into a character wearing a different costume. The character after evolution can have a capability exceeding the upper limit of the capability of the selected character before evolution.

Figure 11A:
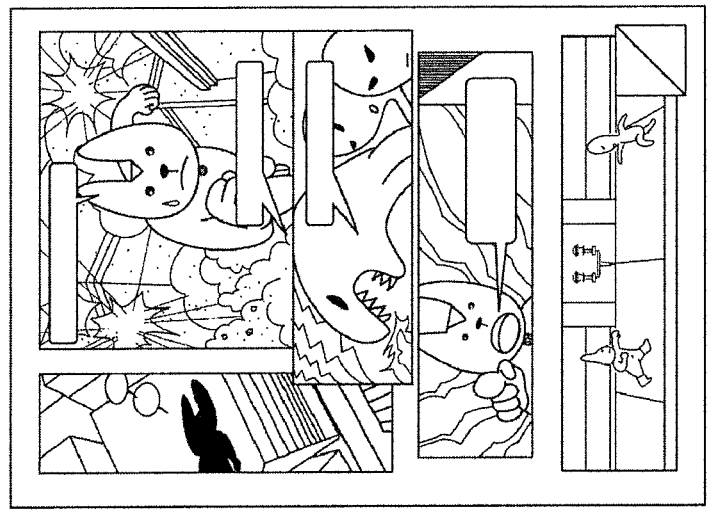
FIGS. 11A and 11B are schematic diagrams explaining examples of the game.
Figure 11B:
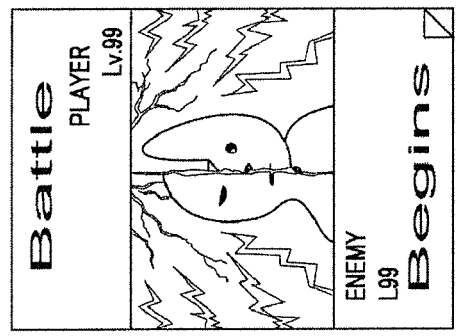

As shown in FIG. 11A, even before the battle, it is possible to advance the story in a format like a cartoon. Then, after a battle start screen is displayed as shown in FIG. 11B, the battle is started.

Figure 12:
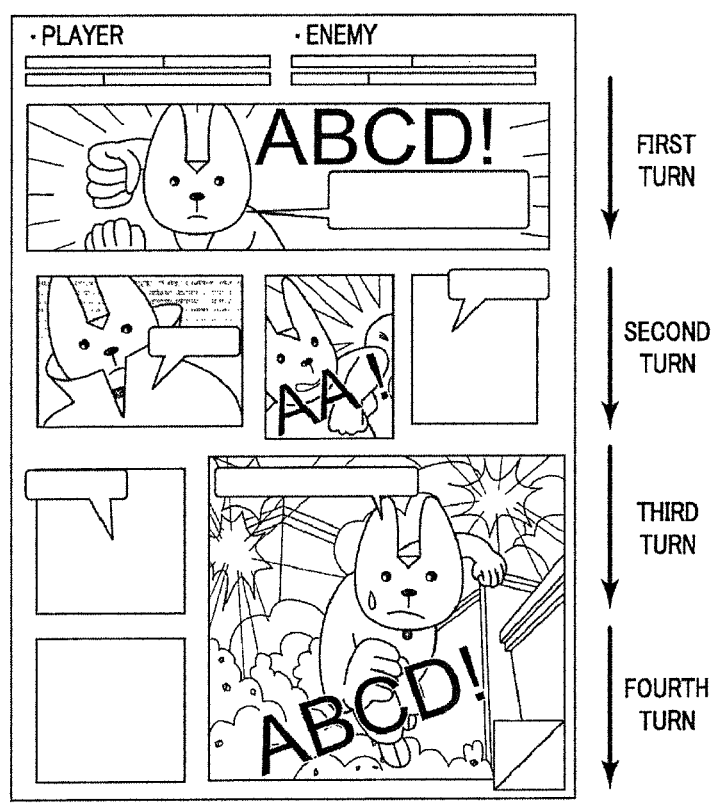
FIG. 12 is a schematic diagram explaining an example of the game.

In such a flow of the game, when a battle starts, the battle using the game display screen described above is performed. FIG. 12 shows another example of the game display screen. For the enemy character and the character selected by the user, it is possible to set the compatibility according to the attributes. In addition, when three or more specific panels are disposed within one game display screen, it is also possible to generate a combo exhibiting the effect beyond the effects of these cards.

Those described above show example of the representative configurations, and my storage media, game programs, methods and apparatus are not limited to the example.

What is claimed:

1. A non-transitory computer readable recording medium storing game program code instructions for a game in which a first user and a second user do battle, and when the game program code instructions are executed by a computer, the game program code instructions cause the computer to perform:

a panel selection function of selecting, using the computer, a plurality of panels to be disposed in a plurality of divisions of a game display screen including a display region formed by the divisions, wherein each panel is to be disposed in a frame portion superimposed on one or more of the plurality of divisions;

a panel layout function of disposing, using the computer, the panels in the frame portions on the basis of the selection by the panel selection function;

a screen display control function of controlling, using the computer, the game display screen on a screen display unit on the basis of information regarding the layout by the panel layout function; and a frame execution function of performing the battle by executing, using the computer, the frame portions in which the panels are disposed by the panel layout function in a predetermined order, wherein a size of each panel corresponds to a capability assigned to each panel, and at least one of the panels is displayed, using the computer, emphasized in a manner differently than other panels when the frame portion of that panel is executed.

2. The non-transitory computer readable recording medium according to claim 1, wherein a first panel of the plurality of panels has a first size corresponding to a first number of the divisions, and a second panel of the plurality of panels has a second, different size corresponding to a second, different number of the divisions.

3. The non-transitory computer readable recording medium according to claim 2, wherein the first size is greater than the second size, such that an effect of the capability assigned to the first panel is greater than an effect of the capability assigned to the second panel.

4. The non-transitory computer readable recording medium according to claim 2, wherein the first size is greater than the second size, and the first panel is arranged earlier in the predetermined order than the second panel, such that the first panel leads the battle relative to the second panel.

5. The non-transitory computer readable recording medium according to claim 2, wherein the battle is performed turn-by-turn, each turn corresponds to a predetermined number of the divisions, and the first size is greater than the second size, such that the first panel leads the battle relative to the second panel by spanning multiple divisions in a first turn and/or spanning multiple turns.

6. The non-transitory computer readable recording medium according to claim 1, wherein the capability assigned to each panel includes one or more of an attack capability and a defense capability.

7. The non-transitory computer readable recording medium according to claim 1, wherein a first frame portion in which a first panel of the plurality of panels is disposed and a second frame portion in which a second panel of the plurality of panels is disposed are displayed differently.

8. The non-transitory computer readable recording medium according to claim 1, wherein the panels indicate characters that the first user and the second user use for attack or defense in the game.

9. A game processing method for a game in which a first user and a second user do battle, and when executed by a computer, the game processing method causes the computer to perform:

a panel selection step of selecting, using the computer, a plurality of panels to be disposed in a plurality of divisions of a game display screen including a display region formed by the divisions, wherein each panel is to be disposed in a frame portion superimposed on one or more of the plurality of divisions;

a panel layout step of disposing, using the computer, the panels in the frame portions on the basis of the selection by the panel selection step;

a screen display control step of controlling, using the computer, the game display screen on a screen display unit on the basis of information regarding the layout by the panel layout step; and a frame execution step of performing the battle by executing, using the computer, the frame portions in which the panels are disposed by the panel layout step in a predetermined order, wherein a size of each panel corresponds to a capability assigned to each panel, and at least one of the panels is displayed, using the computer, emphasized in a manner differently than other panels when the frame portion of that panel is executed.

10. An information processing apparatus that controls a game in which a first user and a second user do battle, comprising a computer programmed to act as:

a control unit, wherein the control unit includes:

a screen display control section that displays, using the computer, a game display screen that includes a display region formed by a plurality of divisions, on a screen display unit;

a panel selection section that selects, using the computer, a plurality of panels to be disposed in the plurality of divisions of the display region, wherein each panel is to be disposed in a frame portion superimposed on one or more of the plurality of divisions;

a panel layout section that disposes, using the computer, the panels in the frame portions on the basis of the selection by the panel selection section; and a frame execution section that performs the battle by executing, using the computer, the frame portions in which the panels are disposed by the panel layout section in a predetermined order, wherein the screen display control section controls, using the computer, the game display screen on the screen display unit on the basis of information regarding the layout by the panel layout section, a size of each panel corresponds to a capability assigned to each panel, and at least one of the panels is displayed, using the computer, emphasized in a manner differently than other panels when the frame portion of that panel is executed.

* * * * *